A. E. ANDERSON.
ATTACHMENT FOR DRILL PRESSES.
APPLICATION FILED MAY 10, 1912.

1,060,574.

Patented May 6, 1913.

2 SHEETS—SHEET 2.

Witnesses:
Thomas Colson
C. E. Wessels

Inventor:
Anders Emil Anderson,
By Joshua R. H. Potts
His Attorney.

UNITED STATES PATENT OFFICE.

ANDERS EMIL ANDERSON, OF LAKE FOREST, ILLINOIS, ASSIGNOR OF ONE-HALF ANDERS G. JOHNSON, OF LAKE FOREST, ILLINOIS.

ATTACHMENT FOR DRILL-PRESSES.

1,060,574.  Specification of Letters Patent.  Patented May 6, 1913.

Application filed May 10, 1912.  Serial No. 696,340.

*To all whom it may concern:*

Be it known that I, ANDERS EMIL ANDERSON, formerly a subject of the King of Sweden, but having since declared my intention of becoming a citizen of the United States, a resident of the city of Lake Forest, county of Lake, and State of Illinois, have invented certain new and useful Improvements in Attachments for Drill-Presses, of which the following is a specification.

My invention relates to improvements in devices for supporting work on drill presses and the like, and the object of my improvement is to provide a device of this character, which is simple of construction and efficient in operation.

The invention consists in the combinations and arrangements of parts hereinafter described and claimed.

Figures 5, 6:
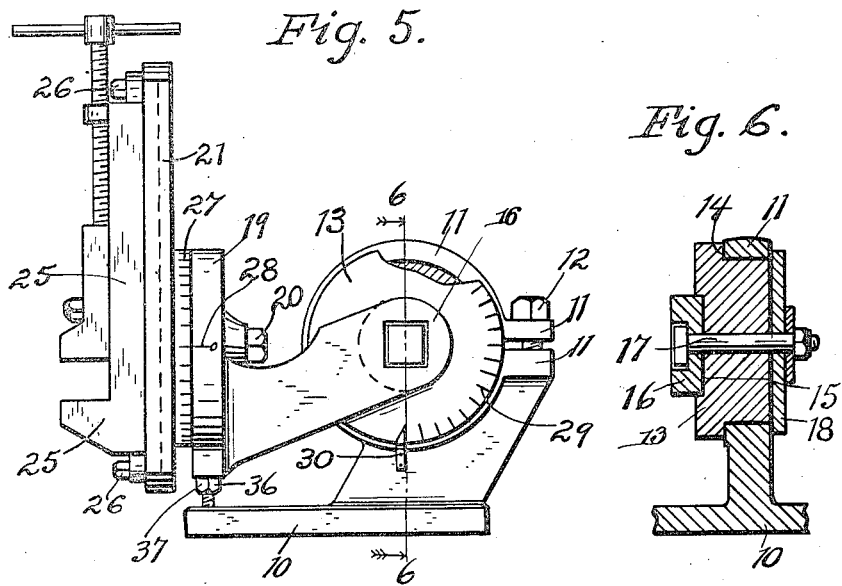
Figures 7, 8:
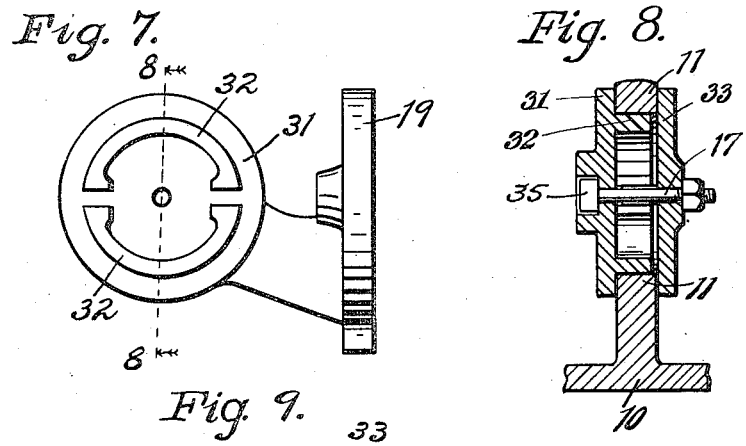
Figure 9:
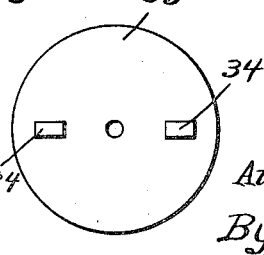

The invention will be best understood by reference to the accompanying drawings forming a part of this specification, and in which, Figure 1 is a side elevation of my device without the work holding means, Fig. 2 is an end elevation of the same Fig. 3 is an enlarged section of the circular perforation holding member, Fig. 4 is a side elevation of my device illustrating the method of attaching said circular perforation holding member, Fig. 5 is a side elevation of my device showing the vise attachment, Fig. 6 is a sectional elevation of the same taken on line 6—6 of Fig. 5, Fig. 7 illustrates a side elevation of a modified form of supporting arm in my device, Fig. 8 is a section of my device taken on the line indicated by the line 8—8 in Fig. 7, and Fig. 9 is a side elevation of the washer used in connection with the modified form.

The preferred form of construction, as illustrated in the drawings comprises a base 10 having a circular clamping member 11 adjusted by means of a cap screw 12. In said circular clamping member 11 is removably secured a circular head portion 13 having a shoulder 14 to fit against the side of the clamping member 11. In the side of said circular head 13 is a recess 15 in which is removably secured an arm 16 and in said arm 16 is a square recess adapted to prevent the securing bolt 17 from turning therein. The bolt 17 is used to bind the arm 16 to the circular head 13 and a washer 18 is provided on the reverse side of the circular clamp 11. The arm 16 is provided with a circular head 19 having its outer surface in a plane perpendicular to a line drawn through its central portion and the axial center of said arm 16. Said head member 19 is provided with a perforation through which is secured a bolt 20 used to bind the work supporting member 21 thereto. The work supporting member 21 is provided with a circular hub to engage the outer surface of said head member 19 in a manner to allow the work supporting member 21 to be rotated on said bolt 20. The bolt 20 is provided with a square head and fitted in a square recess to render the head of the bolt 20 flush with the working surface of said supporting member 21.

The supporting member 21 may be removed and a cylindrical member 22 secured on the bolt 20 to support work having circular perforations, such as pulleys and the like. The pulley for instance is supported on such member 22 and manually held to prevent it from rotating thereon. A recess 24 is formed in the cylindrical supporting member 22 so that the point of a drill or other tool after passing through the work held on said member will enter such recess to prevent defacing the supporting member.

Small and irregular work may be held in a vise 25, illustrated in Fig. 5, which is secured to the supporting member 21 by means of bolts 26. Graduations 27 are provided on the hub portion of the supporting member 21 and a pointer 28 provided on the head portion 19 so that the supporting member 21 may be rotated on the bolt 20 in a desired manner. Graduations 29 are formed on the head portion 13 and a finger 30 provided on the base portion 10 so that the head 13 may be set in desired positions.

A modification of the head portion 13 is illustrated in Figs. 7, 8 and 9. In this form the head portion 31 is provided with a slitted annular shoulder 32 to engage the inside of the circular clamping member 11 and a washer 33 having tongues 34 adapted to engage the slits in the tongue 32, as illustrated in Fig. 8, is provided with an opening through its central portion and a bolt 35 adjusted therethrough to bind the head portion 32 and washer portion 33 tightly against the inside of the circular clamp 11. This form is more desirable in small patterns of my device.

In adjusting the device on the axis in the center of bolt 17, the clamping screw 12 may be loosened and the arm rotated in the clamping member 11, or the bolt 17 may be loosened and the arm 15 swung on the head 13. This is especially desirable when making quick changes in the device and when it is not desired to set it at certain fixed positions. In the lower edge of the head 19 is fitted a screw adjustment 36 provided with a lock nut 37 by which fine adjustment of the arm 13 may be made in order to secure the work at certain angles. A reinforcing member 38 is removably supported on the base 10 and provided with a screw support 39 to engage the under side of the arm 15 in supporting heavy work to give greater rigidity to the work supporting device.

While I have illustrated and described the preferred form of construction for carrying my invention into effect, this is capable of variation and modification without departing from the scope of the claims. I, therefore, do not wish to be limited to the precise details of construction set forth, but desire to avail myself of such variations and modifications as come within the scope of the appended claims.

Having described my invention what I claim as new and desire to secure by Letters Patent is:

1. The combination with a base; a circular clamping member carried by said base; a head adjustably mounted in said circular clamping member and provided with a shoulder around one end and a recess in such end; an arm having one end fitted in said recess; a washer; and a bolt through said arm, head and washer clamping said circular clamping member between said washer and the shoulder on said head to adjustably secure said head in said circular clamping member and said arm in said recess, substantially as described.

2. The combination with a base; a circular clamping member carried by said base; a head adjustably mounted in said circular clamping member and provided with a shoulder around one end and a recess in such end; an arm having one end fitted in said recess; a washer; a bolt through said arm, head and washer clamping said circular clamping member between said washer and the shoulder on said head to adjustably secure said head in said circular clamping member and said arm in said recess; a work securing head carried by said arm; and an auxiliary support adjustably secured in said work holding head, substantially as described.

3. The combination with a base, of a slitted circular clamping member carried by said base; a head rotatively mounted in said slitted circular clamping member and provided with a shoulder around one of its ends engaging the side of such clamping member, said head being also provided with a perforation through its axial portion and a recess around one end of such perforation; means for clamping said slitted circular clamping member around said head; an arm having one end fitted in said recess and provided with a perforation; a washer; a bolt through said arm, head and washer clamping said slitted circular clamping member between said shoulder and said washer on said head; and a work securing head on said arm, substantially as described.

In testimony whereof I have signed my name to this specification in the presence of two subscribing witnesses.

ANDERS EMIL ANDERSON.

Witnesses:
ARTHUR A. OLSON,
JOSHUA R. H. POTTS.